UNITED STATES PATENT OFFICE.

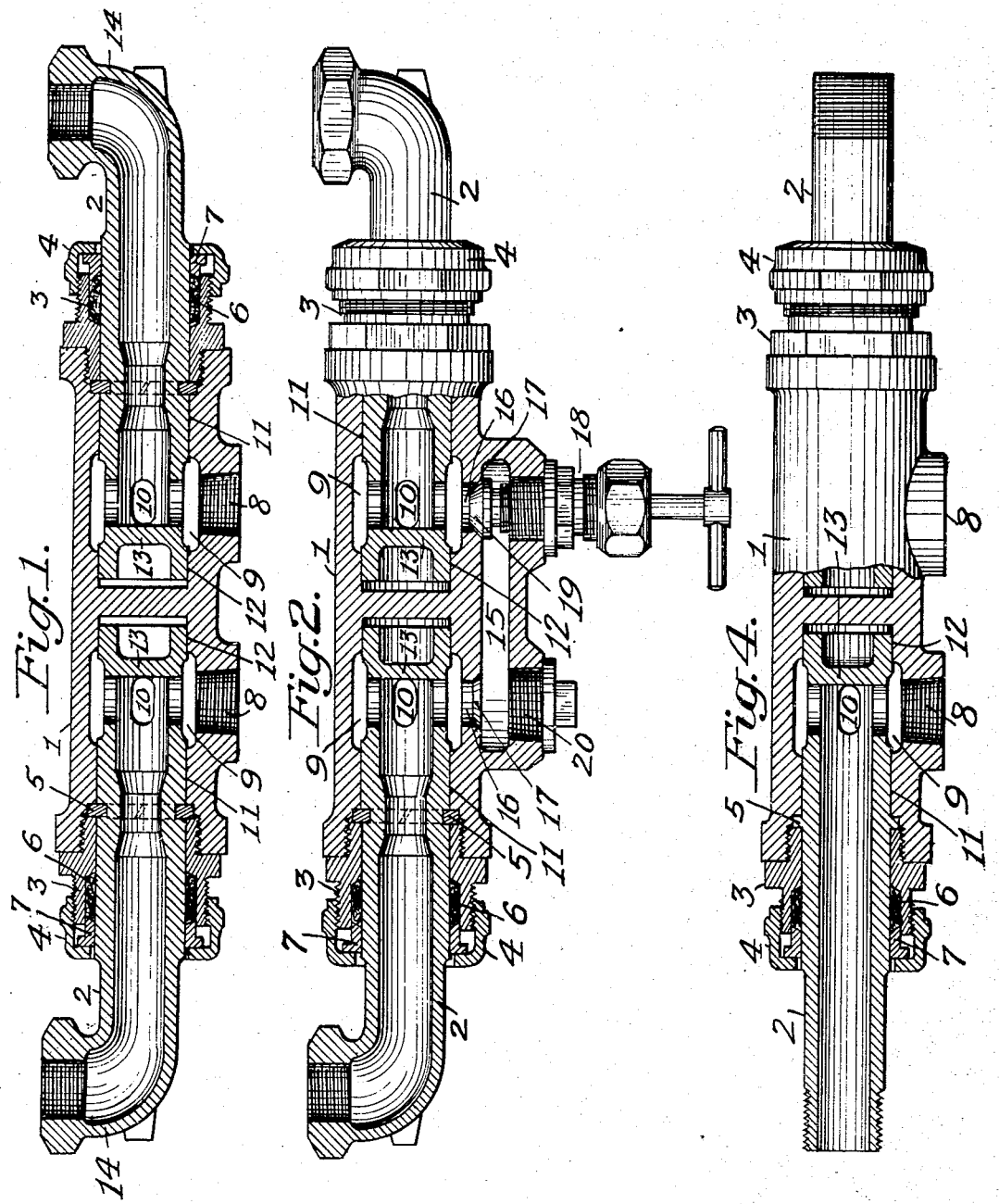

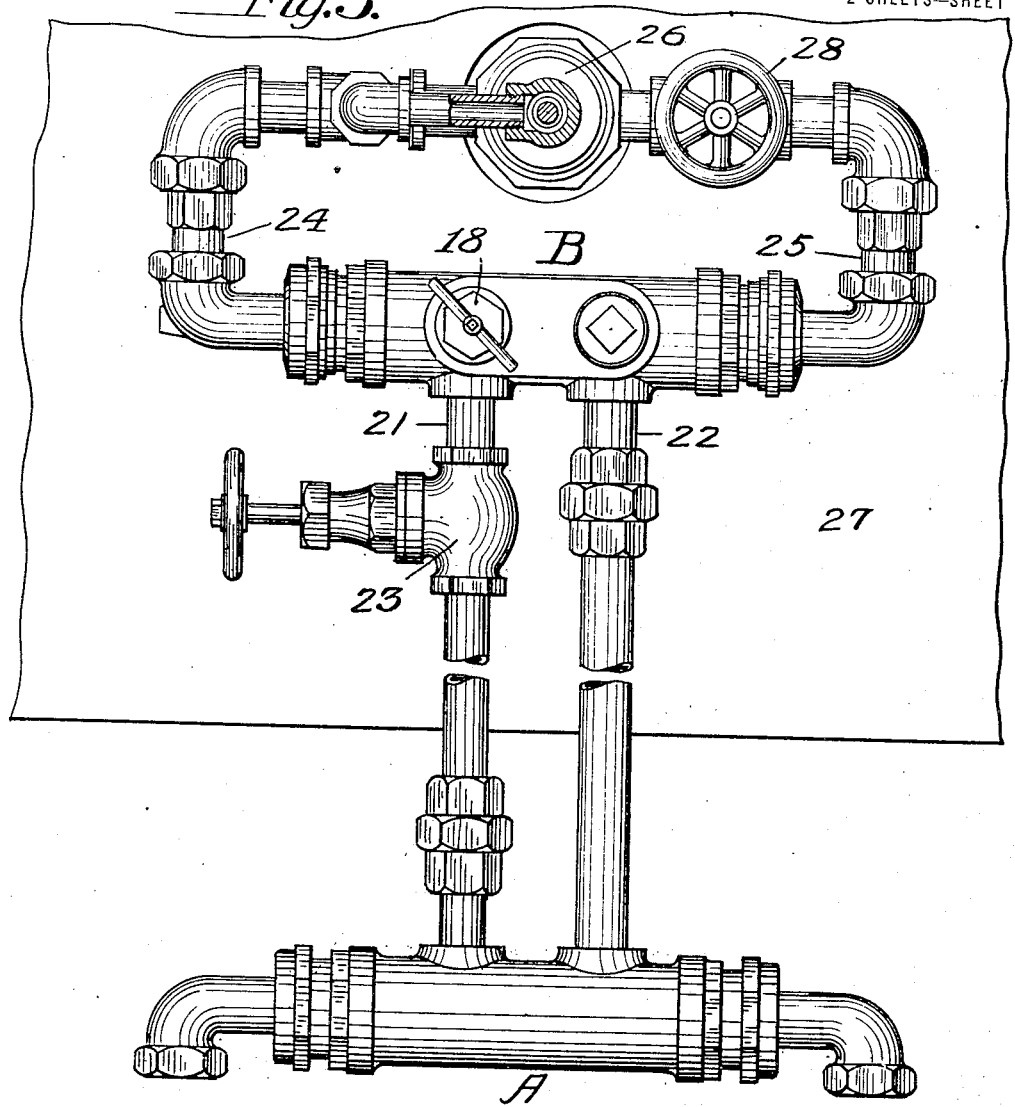
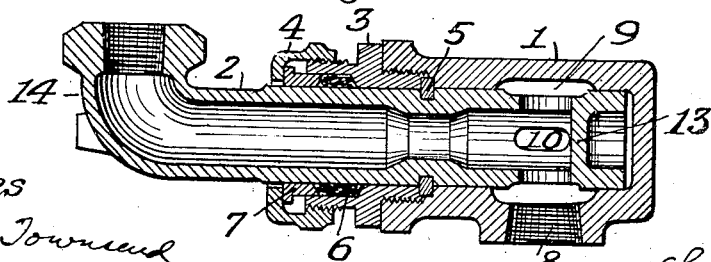

SOREN SANNE-JACOBSEN, OF BEAVER, PENNSYLVANIA; CLARA JACOBSEN ADMINISTRATRIX OF SAID SOREN SANNE-JACOBSEN, DECEASED.

SWIVEL CONNECTION.

1,323,320.      Specification of Letters Patent.      Patented Dec. 2, 1919.

Application filed March 13, 1918. Serial No. 222,124.

*To all whom it may concern:*

Be it known that I, SOREN SANNE-JACOBSEN, a citizen of the United States, and resident of Beaver, Beaver county, Pennsylvania, have invented a new and useful Improvement in Swivel Connections, of which the following is a specification.

This invention relates to a swivel connection.

The object of the invention is to provide a swivel connection suitable for use with oil burners, or similar devices, which is so arranged that a long bearing surface is provided between the body of the connection and the swivel member proper; such bearing surface being so arranged that the swivel member does not have a bearing in the stuffing box of the device, and the bearing surfaces and fluid passages being so disposed as to avoid unequalized stresses at any point in the structure. A further object of the invention is to provide a double-swivel connection, with a pair of fluid passages, in which the body member of the connection comprises a single integral member, so arranged that the fluids in the different passages need not become mixed during their passage through the swivel connection; and in which the swivel members are so formed that the fluid passing through the connection under pressure may exert a back pressure on the swivel members, for neutralizing the pressure tending to force the swivel members from position in the body member. A still further object of the invention is to provide a double-swivel connection, having an integral body member, in which a valved by-pass connecting the two fluid passages is formed integral with the body member of the connection.

In the accompanying drawings, Figure 1 is a vertical sectional view of the preferred form of double-swivel connection; Fig. 2 is a view similar thereto, but showing a structure which includes a by-pass integral with the body of the connection; Fig. 3 is an elevation illustrating the use of the device in the steam and oil connections of an oil burner; Fig. 4 is a vertical setional view illustrating slight structural modifications to the double-swivel connection shown in Fig. 1; and Fig. 5 is a vertical section through a single swivel constructed according to the design of the double swivel illustrated in Fig. 1.

The preferred form of the device, illustrated in Fig. 1 of the drawings, comprises an integral body member 1, and a pair of swivel, or conduit, members 2 having bearings therein. Each of the swivel members 2 extends a considerable distance inwardly of the body member; and is held in place therein by means of a stuffing box 3 having a screw-threaded engagement with the interior surface of the body member, a locking nut 4 screw-threaded to the stuffing box, and a locking ring 5 seating in the swivel 2 and bearing against a suitable shoulder in the body member 1 and against the stuffing box 3. The ring 5 is necessarily a split ring, in order that it may be placed in position in assembling the device. The stuffing box 3 is, in use of the device, provided with suitable packing 6 held in place by a follower 7 against which the nut 4 bears.

Inlets 8, arranged to have conduits connected thereto, lead to the interior of the body member 1 for conducting the fluid thereinto. With the parts in assembled position, these inlets open into annular chambers 9 surrounding the swivel members 2, and having communication therewith through a plurality of ports 10 through the walls of the swivel members. The inlet 8 is in each case so positioned as to leave a long bearing 11 between the swivel member 2 and the body member 1 outwardly of the inlet 8, and a relatively shorter bearing 12 inwardly of the inlet. This arrangement tends to equalize stresses, and prevents an undue stress on the inner lying bearing 12, due to the weight of the outer portion of the member 2 and the connections attached thereto. Because of the long direct bearing between the swivel and body members, the stuffing boxes 3 may be loosely fitted, so that they are practically negligible as bearings. This fact lessens any tendency of the stuffing boxes to work loose from position, and reduces wear on the packing used. The loose fitting of the stuffing boxes also results in a smooth and even turning action at both ends of the swivel connection, since if the structure were such as to necessitate a tight fitting bearing in the stuffing boxes, any inequality in the tightening of the stuffing boxes at opposite ends of the swivel connection would result in a tendency for one end to turn more readily than the other and thus cause a straining or wrenching of the entire structure.

At the inner extremity of each of the swivel members 2, is provided a diaphragm 13, so arranged that the fluid passing through the member may exert a pressure thereagainst and serve to counteract the tendency of the fluid to force the member 2 outwardly in the body member 1. In the preferred form of the device each of the swivel members 2 is formed to provide an integral elbow 14 arranged at its extremity for suitable pipe connection. This arrangement presents the advantage that the swiveling movement of the device will not tend to loosen the connection between the pipe and the swivel member 2, since such connection is normal to the direction of rotation of the swivel member. It will be noted that each of the fluid inlets 8 leads to a separate passage having no communication with the other passage leading through the swivel connection, so that different fluids may be conducted through the same connection without becoming commingled in their passage therethrough.

The structure illustrated in Fig. 2 of the drawings, comprises all the details of that illustrated in Fig. 1, but in addition has, formed integral with the body member 1, the by-pass 15 connecting the fluid passages therethrough. This by-pass 15 is preferably concentric with the body member 1, and connects with the interior thereof by means of ports 16, which lead to the annular passage 9, the ports being so formed as to provide suitable valve seats 17. Diametrically in line with each of the ports 16 are screw-threaded openings through the wall of the by-pass. In either one, or both, of these openings may be inserted suitably arranged valve mechanism 18 provided with a valve plunger 19 arranged to regulate the ports 16 in line therewith. If only one such valve is employed, the other opening may be closed by means of a screw-threaded plug 20. This structure permits the fluid in one of the passages through the swivel to be by-passed through either passage therein, so that if the device is used in connections conveying fluids of different nature, as for instance oil and steam, the steam may be by-passed through the oil passage to clean such passage and any device with which it may have connection.

In Fig. 3 of the drawings, the form of the device B provided with a by-pass, and the simpler form A, are shown disposed in the oil and steam connections of an oil burner. As shown, the inlets 8 of swivel B have connected therewith an oil pipe 21 and a steam pipe 22, the oil pipe 21 being provided with a valve 23. From the double swivel, B, an oil pipe 24 and a steam pipe 25 lead to an oil burner 26 arranged in connection with a furnace 27. The steam pipe 25 is provided with a valve 28. With the connections shown, the oil and steam pass separately through the double swivel, B, and through the pipes 24 and 25 into the burner 26, in which they are mixed. When so desired, the pipes 24 and 25, together with the burner 26 may be swung backwardly, on the swivel B out of position in the furnace 27; while the entire structure may be swung backwardly on the swivel A. In order to cause a current of steam to pass through the oil pipe 24 and burner 26, the valve 23 in oil pipe 21 and valve 28 in steam pipe 25 are closed, and the valve 18 is opened to permit steam to pass through the oil pipe 24. The current of steam will thus pass through the oil pipe and through all the oil passages in the burner. It will be noted that the above general arrangement is not in itself novel, but merely illustrates one of a number of arrangements in which the swivel above described may be employed.

The modification illustrated in Fig. 4 of the drawings is identical with that illustrated in Fig. 1, with the exception that integral elbows are not formed on the swivel members 2, and that the locking ring 5 is formed integral with the member 2. The only advantage in omitting the integral elbows 14 is that their absence permits a somewhat greater latitude in the form of stuffing box and packing employed in connection with the other important features of the structure, it being understood that the particular form of stuffing box and packing shown throughout are optional and illustrative only.

The swivel connection above described provides a structure in which ease and uniformity in the swiveling action is obtained by providing a long bearing surface between the swivel and body members of the device and thereby eliminating the stuffing box as a bearing for the swivel. It provides a compact and rigid structure through which two fluids of different nature may be led without commingling of the same, and also provides a structure in which all stresses and forces tending to cause displacement of the parts are effectually equalized or neutralized. It also provides a structure in which the parts may be formed by casting, and thereafter easily machined, so that the device as a whole may be readily and economically constructed.

What I claim is:

1. A swivel connection comprising a tubular body member; and a tubular swivel member arranged to be secured in position and have a long bearing engagement therein; said body member and swivel member being provided with fluid inlets disposed partway of the bearing engagement between said members, and the bearing contact outwardly of said inlets being of greater extent than that inwardly thereof.

2. A swivel connection comprising a tubular body member, a tubular swivel member arranged to be secured in position and have a long bearing engagement therein, said body member and swivel member being provided with fluid inlets disposed partway of the bearing engagement between said members and the bearing contact outwardly of said inlets being of greater extent than that inwardly thereof, and a diaphragm closing the bore through said swivel member at a point inwardly of said inlets.

3. A double swivel connection comprising an integral body member of tubular form and providing therein a pair of longitudinally disposed passages unconnected in the body of said member, and a pair of tubular swivel members arranged to be secured in position and have long bearing engagement in said body member, said body member and swivel members being provided with fluid inlets disposed partway of the bearing engagement therebetween.

4. A double swivel connection comprising an integral body member of tubular form and providing therein a pair of longitudinally disposed passages unconnected in the body of said member, a pair of tubular swivel members arranged to be secured in position and have long bearing engagement in the interior of said body member, said body member and swivel members being provided with fluid inlets disposed partway of the bearing engagement between said members, and the bearing contacts outwardly of said inlets being of greater extent than those inwardly thereof.

5. A double swivel connection comprising an integral body member of tubular form and providing therein a pair of longitudinally disposed passages unconnected in the body of said member, a pair of tubular swivel members arranged to be secured to and have long bearing engagement with the interior of said body member, said body member and swivel members being provided with fluid inlets disposed partway of the bearing engagement between said members, and diaphragms closing the bores through said swivel members at points inwardly of said inlets.

6. A double swivel connection comprising an integral body member of tubular form and providing therein a pair of longitudinally disposed passages unconnected in the body of said member, a pair of tubular swivel members arranged to be secured to and have long bearing engagement in the interior of said body member, said body member and swivel members being provided with fluid inlets disposed partway of the bearing engagement between said members and the bearing contacts outwardly of said inlets being of greater extent than those inwardly thereof, and diaphragms closing the bores through said swivel members at points inwardly of said inlets.

7. A double swivel connection comprising an integral body member of tubular form and providing therein a pair of passages longitudinally disposed in the same plane and unconnected in the body of said member, an independently valved by-pass structure on said member arranged substantially parallel to the longitudinal axis of said member and arranged to connect said passages, and a pair of tubular swivel members arranged to be secured in position and have long bearing engagement in said body member, said body member and swivel members being provided with fluid inlets partway of the bearing engagement therebetween.

8. A double swivel connection comprising an integral body member of tubular form and providing therein a pair of passages longitudinally disposed in the same plane and unconnected in the body of said member, an independently valved by-pass structure in said member arranged to connect said passages, and a pair of tubular swivel members arranged to be secured in position and have long bearing engagement in said body member; said body member and swivel members being provided with fluid inlets partway of the bearing engagement therebetween, and the bearing contacts outwardly of said inlets being of greater extent than those inwardly thereof.

9. A double swivel connection comprising an integral body member of tubular form and providing therein a pair of longitudinally disposed passages unconnected in the body of said member, an independently valved by-pass structure on said member arranged to connect said passages, and a pair of tubular swivel members arranged to be secured to and have long bearing engagement in the interior of said body member, said body member and swivel members being provided with fluid inlets disposed partway of the bearing engagement between said members and the bearing contacts outwardly of said inlets being of greater extent than those inwardly thereof, and diaphragms closing the bores through said swivel members at points inwardly of said inlets.

In witness whereof I have hereunto set my hand.

S. SANNE-JACOBSEN.

Witnesses:
W. C. McClure,
Thos. Gannestad.